(12) United States Patent
Hayashi et al.

(10) Patent No.: US 9,332,208 B2
(45) Date of Patent: May 3, 2016

(54) IMAGING APPARATUS HAVING A PROJECTOR WITH AUTOMATIC PHOTOGRAPHY ACTIVATION BASED ON SUPERIMPOSITION

(71) Applicant: FUJIFILM Corporation, Tokyo (JP)

(72) Inventors: Daisuke Hayashi, Saitama (JP); Shigeru Kondou, Saitama (JP); Takashi Aoki, Saitama (JP); Kazuki Inoue, Saitama (JP); Hiroyuki Oshima, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/485,055

(22) Filed: Sep. 12, 2014

(65) Prior Publication Data

US 2015/0002633 A1    Jan. 1, 2015

Related U.S. Application Data

(63) Continuation of application No. PCT/JP2012/081540, filed on Dec. 5, 2012.

(30) Foreign Application Priority Data

Mar. 13, 2012  (JP) ................................. 2012-056012

(51) Int. Cl.
*H04N 5/74* (2006.01)
*G03B 17/54* (2006.01)
(Continued)

(52) U.S. Cl.
CPC .............. *H04N 5/7475* (2013.01); *G03B 17/54* (2013.01); *H04N 5/2251* (2013.01);
(Continued)

(58) Field of Classification Search
CPC .............. H04N 5/7475; H04N 5/2251; H04N 5/23219; H04N 5/23222; H04N 5/23293; H04N 5/2628; H04N 5/265; H04N 13/0203; G03B 17/54; G03B 35/10
See application file for complete search history.

(56) References Cited

U.S. PATENT DOCUMENTS

| 5,253,306 A * | 10/1993 | Nishio ................. G06K 9/6202 348/129 |
| 2005/0237381 A1* | 10/2005 | White .................... H04N 7/144 348/14.16 |

(Continued)

FOREIGN PATENT DOCUMENTS

| JP | 2002-152779 A | 5/2002 |
| JP | 2006-80875 A | 3/2006 |

(Continued)

*Primary Examiner* — Jay Patel
*Assistant Examiner* — Joseph Suh
(74) *Attorney, Agent, or Firm* — Birch, Stewart, Kolasch & Birch, LLP

(57) ABSTRACT

An imaging apparatus having a projector, includes: an imaging unit that photographs a subject; a mirror image converting unit that converts a live view image photographed by the imaging unit into a mirror image; a projector that projects the mirror image of the live view image in a direction opposite to a photographing direction of the imaging unit; a control unit that initiates actual photography for recording the subject by the imaging unit when a posture of a main subject satisfies a predetermined condition; and a pose image superimposing unit that superimpose a pose image on a projected image, in which the control unit determines that the predetermined condition is satisfied and performs the actual photography when a superimposition degree of the main subject in the projected image and the pose image is a threshold value or more.

3 Claims, 21 Drawing Sheets

(51) Int. Cl.
*H04N 5/225* (2006.01)
*H04N 5/232* (2006.01)
*H04N 5/262* (2006.01)
*H04N 5/265* (2006.01)
*H04N 13/02* (2006.01)
*G03B 35/10* (2006.01)

(52) U.S. Cl.
CPC ...... *H04N 5/23219* (2013.01); *H04N 5/23222* (2013.01); *H04N 5/23293* (2013.01); *H04N 5/265* (2013.01); *H04N 5/2628* (2013.01); *H04N 13/0203* (2013.01); *G03B 35/10* (2013.01)

(56) References Cited

U.S. PATENT DOCUMENTS

| | | | | |
|---|---|---|---|---|
| 2006/0125919 | A1* | 6/2006 | Camilleri | B60R 1/00 348/148 |
| 2007/0115484 | A1* | 5/2007 | Huang | G01B 11/2527 356/604 |
| 2008/0067979 | A1 | 3/2008 | Hayasaki | |
| 2008/0174682 | A1* | 7/2008 | Faisman | H04N 7/181 348/239 |
| 2010/0266206 | A1* | 10/2010 | Jo | G06K 9/00261 382/190 |
| 2012/0105662 | A1* | 5/2012 | Staudacher | H04N 5/23222 348/222.1 |
| 2012/0119984 | A1* | 5/2012 | Sankarasubramaniam | G06F 3/017 345/156 |
| 2012/0135745 | A1* | 5/2012 | Kaplan | G01C 21/32 455/456.1 |
| 2012/0212647 | A1* | 8/2012 | Ueno | G03B 17/54 348/231.99 |
| 2013/0016913 | A1* | 1/2013 | Pham | G06T 7/0042 382/197 |

FOREIGN PATENT DOCUMENTS

| | | | | |
|---|---|---|---|---|
| JP | 2008-72870 A | | 3/2008 | |
| JP | WO 2008123443 A1 | * | 10/2008 | ............ H04N 5/225 |
| JP | 2011-95430 A | | 5/2011 | |
| JP | 2011-182014 A | | 9/2011 | |
| JP | 2011-252954 A | | 12/2011 | |
| WO | WO 2008/123443 A1 | | 10/2008 | |

* cited by examiner

HORIZONTAL PHOTOGRAPHING POSTURE

VERTICAL PHOTOGRAPHING POSTURE

United States Patent US 9,332,208 B2

IMAGING APPARATUS HAVING A PROJECTOR WITH AUTOMATIC PHOTOGRAPHY ACTIVATION BASED ON SUPERIMPOSITION

CROSS REFERENCE TO RELATED APPLICATION

This is a continuation of International Application No. PCT/JP2012/081540 filed on Dec. 5, 2012, and claims priority from Japanese Patent Application No. 2012-056012 filed on Mar. 13, 2012, the entire disclosures of which are incorporated herein by reference.

BACKGROUND

1. Technical Field

The present invention relates to an imaging apparatus having a projector and a control method thereof in which usefulness of a projector function is improved.

2. Related Art

An imaging apparatus, such as a digital camera, which is mounted with a projector has recently started to be distributed. When a digital camera has a projector, a photographed image may not be displayed on a small display unit provided on a rear surface of the camera to be checked. Instead, the image may be checked and enjoyed by being projected in an enlarged scale on, for example, a screen or a white wall at a photography site or after a user comes back home, which provides convenience.

However, a projector mounted in a digital camera can be mounted only in a narrow empty space within a case of the digital camera, and thus the projector is limited to a compact one. Accordingly, the image quality or precision of a displayed image is poor as compared to a case where a photographed image is displayed on a large-size home TV receiver or projected by a dedicated large projector.

As described above, when only an image of poor image quality can be displayed, a user of a digital camera cannot find usefulness of the projector. This causes the user to hesitate to purchase the digital camera having the projector which causes an increase of expense due to mounting of the projector.

Therefore, what is required is to improve the image quality of a projected image, and to increase the usefulness of a projector function, so that a camera user is interested in a digital camera having the projector. For example, a digital camera having a projector disclosed in Patent Literature 1 (JP-A-2006-80875), Patent Literature 2 (JP-A-2011-95430), and Patent Literature 3 (WO2008-123443) is configured to project a moving image called a live view image (through image) for use in checking a photographed image in real time on, for example, a back portion of a chair or a wall. In a case of self-shooting of, for example, an identification picture using a digital camera, when the through image can be checked and a photographing composition can be viewed on, for example, a wall behind the camera, failed photos are reduced, which may increase the usefulness of a projector function.

SUMMARY OF INVENTION

When a through image is projected by a projector on, for example, a wall behind the camera, a user himself or herself can check the composition of self-shooting. Thus, the usefulness of the projector function may be improved. However, only the check of the composition is not sufficient to satisfy the user's purchasing desire on the digital camera having the projector. Thus, it is required to further increase the usefulness of the projector function and improve the usability of the projector function.

An illustrative aspect of the present invention is to provide an imaging apparatus having a projector and a control method thereof in which usefulness of a projector function is increased and usability of the projector function is improved.

According to an aspect of the present invention, it is an imaging apparatus having a projector, comprising: an imaging unit that photographs a subject; a mirror image converting unit that converts a live view image photographed by the imaging unit into a mirror image; a projector that projects the mirror image of the live view image in a direction opposite to a photographing direction of the imaging unit; a control unit that initiates actual photography for recording the subject by the imaging unit when a posture of a main subject satisfies a predetermined condition; and a pose image superimposing unit that superimpose a pose image on a projected image, in which the control unit determines that the predetermined condition is satisfied and performs the actual photography when a superimposition degree of the main subject in the projected image and the pose image is a threshold value or more, and the control unit extracts an outline shape of the main subject in the projected image, and performs enlargement and reduction of the mirror image of the live view image of the subject or the pose image so that a size of the outline shape is coincident with a size of the pose image.

With the aspect of the present invention, actual photography may be initiated while a person to be photographed moves so that a posture of a main subject image in an image projected by a projector satisfies a predetermined condition. Thus, the usefulness of a projector function is increased, and the usability of the projector function is also improved.

DESCRIPTION OF EMBODIMENTS

Hereinafter, an exemplary embodiment of the present invention will be described with reference to drawings.

Figure 1:
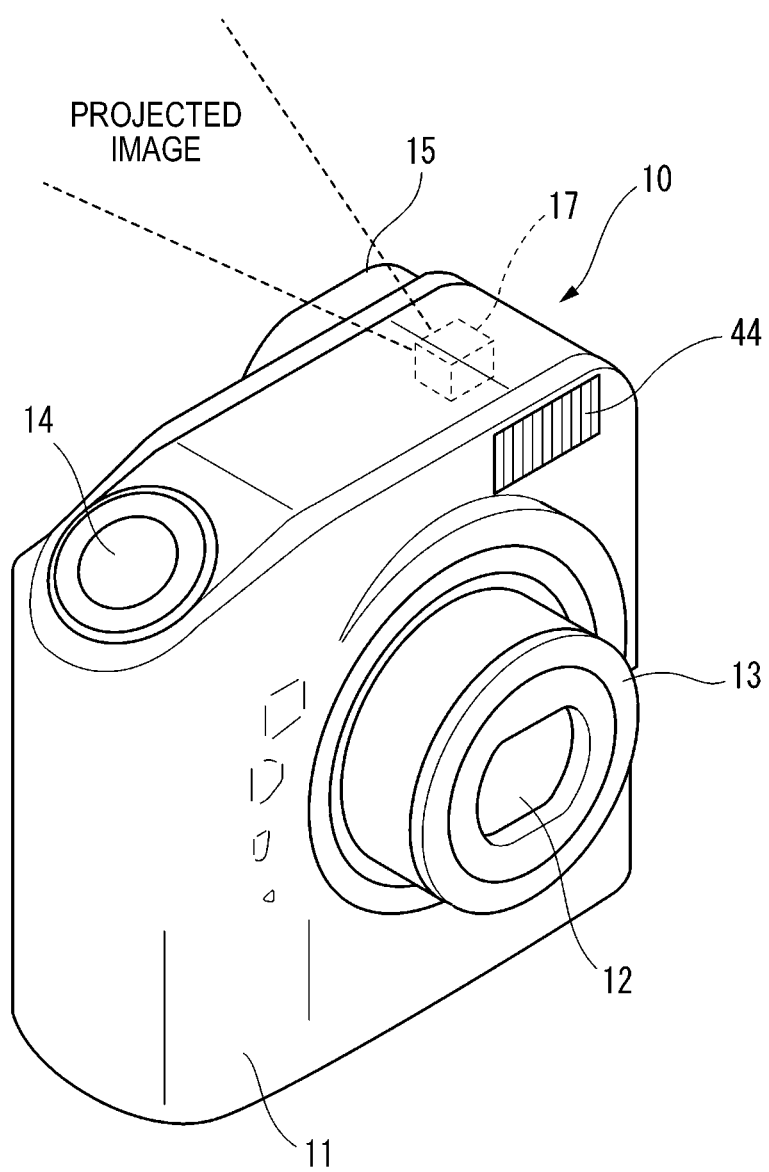
FIG. 1 is an external perspective view of an imaging apparatus according to a first exemplary embodiment of the present invention.

FIG. 1 is an external perspective view of an imaging apparatus (a digital camera) 10 having a projector according to a first exemplary embodiment. The digital camera 10 is provided with a photographing lens 12 on the front portion of a rectangular case 11. The photographing lens 12 is stored within a retractable lens barrel 13. A shutter release button 14 is provided on a left shoulder of the case 11 when viewed from a front side, and an electronic view-finder device 15 is provided at the back side of a right shoulder. A liquid crystal display unit (an LCD 16 in FIG. 2) is provided on the rear surface of the case 11 to display, for example, a photographed image, a through image (a live view image) or a camera menu image. A flash light emitting unit 44 is provided on the front portion of the right shoulder.

The electronic view-finder device 15 includes a small liquid crystal display unit (not illustrated), and a through image displayed on the small liquid crystal display unit is viewed by a user through a finder window. In the present exemplary embodiment, a projector (an image projecting unit) 17 is provided to project a displayed image of the small liquid crystal display unit to the rear side of the camera through the finder window from the user side.

In the illustrated example, the projector is embedded in the electronic view-finder device 15. However, as disclosed in Patent Literature 1, for example, the projector may be provided outside the case 11 of the camera, or embedded in a portion other than the finder.

Figure 2:
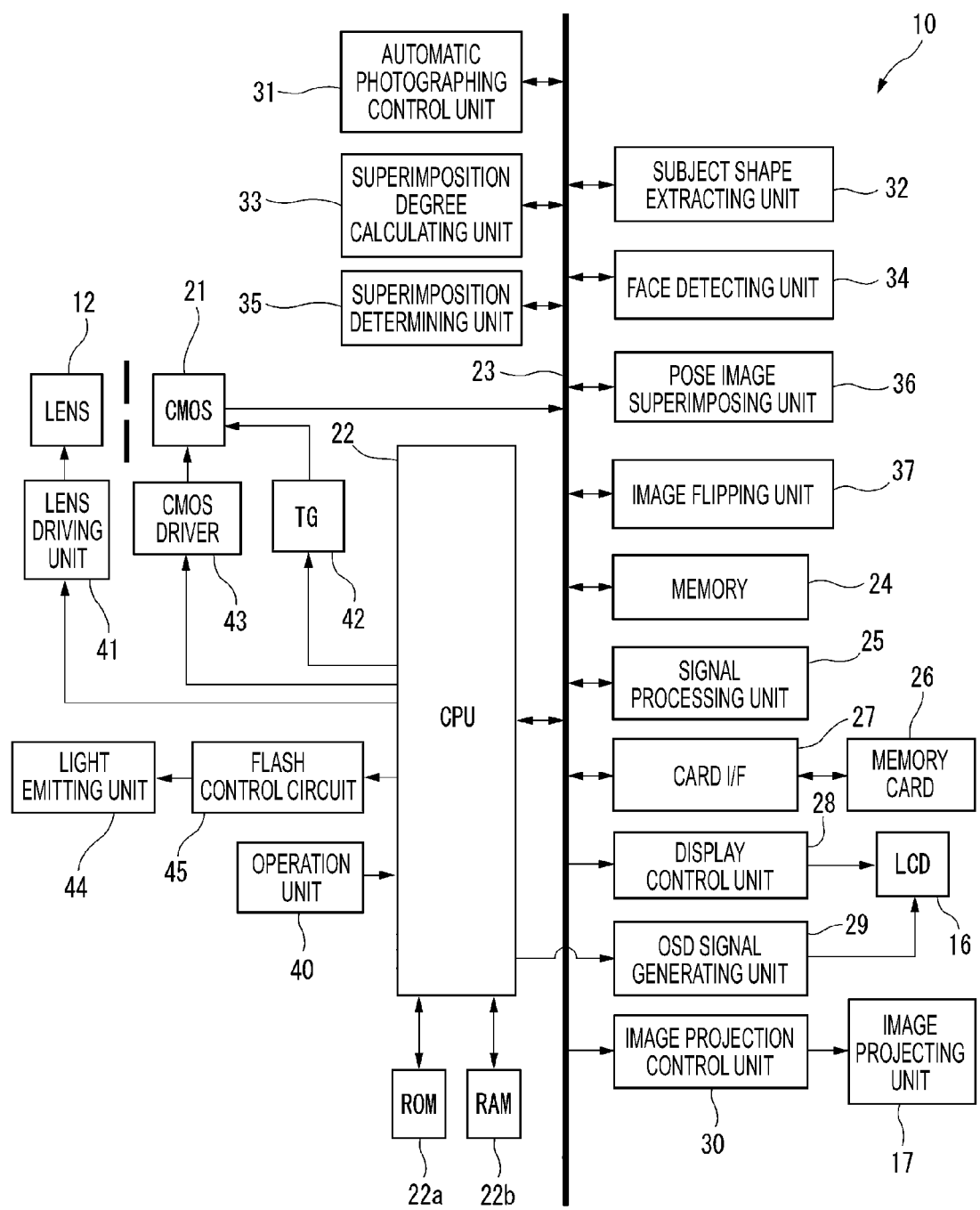
FIG. 2 is a functional block diagram of the imaging apparatus illustrated in FIG. 1.

FIG. 2 is a functional block diagram of the digital camera illustrated in FIG. 1. The digital camera 10 includes an image sensor (a CMOS-type imaging device in the present exemplary embodiment) 21 provided at the back side of the photographing lens 12, and a control unit (CPU) 22 configured to perform a general control of the digital camera 10.

The CPU 22 is connected to a bus 23 which is in turn connected to a frame memory 24, a signal processing unit 25 configured to perform an image processing, a card interface (I/F) 27 configured to store photographed image data compressed in, for example a JPEG format in an external memory card 26, a display control unit 28 configured to perform a display control of the LCD (a liquid crystal display unit) 16 on the camera rear surface, an OSD signal generating unit 29 configured to generate an OSD signal, such as text information, to be displayed on the LCD 16, and an image projection control unit 30 configured to control image projection by the image projecting unit (projector) 17.

The bus 23 is further connected to an automatic photographing control unit 31, a subject shape extracting unit 32, a superimposition degree calculating unit 33, a face detecting unit 34, a superimposition degree determining unit 35, a pose image superimposing unit 36, and an image flipping unit 37.

The subject shape extracting unit 32 extracts an outline of an external shape of a subject. The superimposition degree calculating unit 33 calculates the superimposition degree of a pose image and the outline of the subject by numerical values. The face detecting unit 34 detects when "a face image" is present in the subject through pattern matching. The superimposition degree determining unit 35 compares the superimposition degree calculated by the superimposition degree calculating unit 33 with a threshold value. The pose image superimposing unit 36 superimposes the pose image on a live view image. The image flipping unit 37 converts the live view image into a mirror image.

The CPU 22 is connected to a ROM 22a or a RAM 22b which stores, for example, a control program, and an operation unit 40 including the shutter release button 14. Further, the digital camera 10 is provided with a lens driving unit 41 configured to control, for example, a focus lens position of the photographing lens 12, a timing generator (TG) 42 configured to generate a driving timing signal of the image sensor 21, a driver 43 configured to drive the image sensor 21, and a flash control circuit 45 configured to perform a light emission control of the light emitting unit 44. Control instructions on these respective units are performed by the CPU 22.

Figure 3:
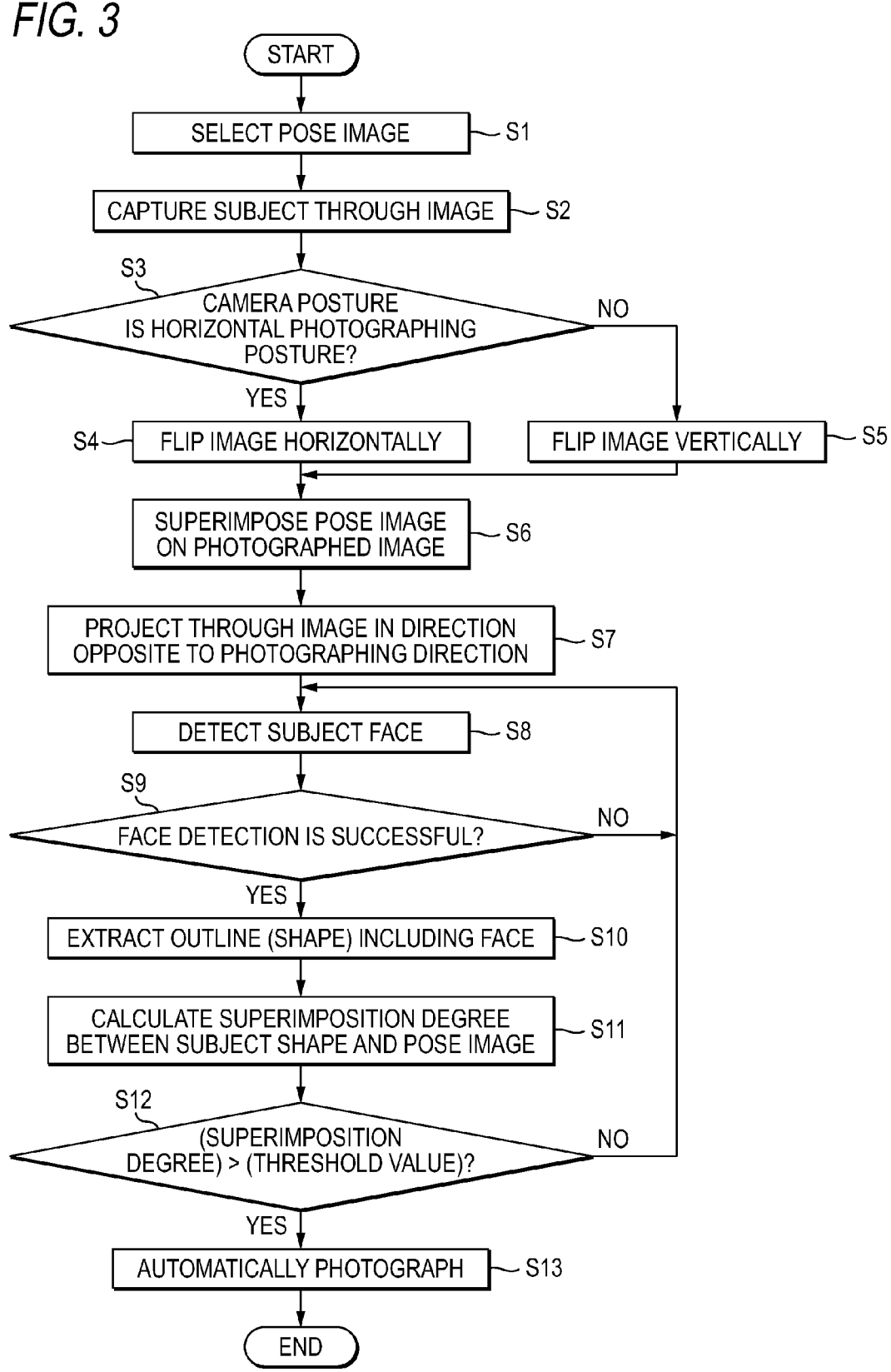
FIG. 3 is a flow chart illustrating a control sequence of the imaging apparatus according to the first exemplary embodiment of the present invention.

FIG. 3 is a flow chart illustrating a processing sequence of a control program which is executed when a user performs, for example, self-shooting by using the digital camera 10. The control program is stored in the ROM 22a, and is executed by the CPU 22 by being read out by the RAM 22b. The automatic photographing control unit 31, the subject shape extracting unit 32, the superimposition degree calculating unit 33, the face detecting unit 34, the superimposition degree determining unit 35, the pose image superimposing unit 36, and the image flipping unit 37, as illustrated in FIG. 2, are functional blocks which are implemented when the CPU 22 executes the control program.

Figure 4:
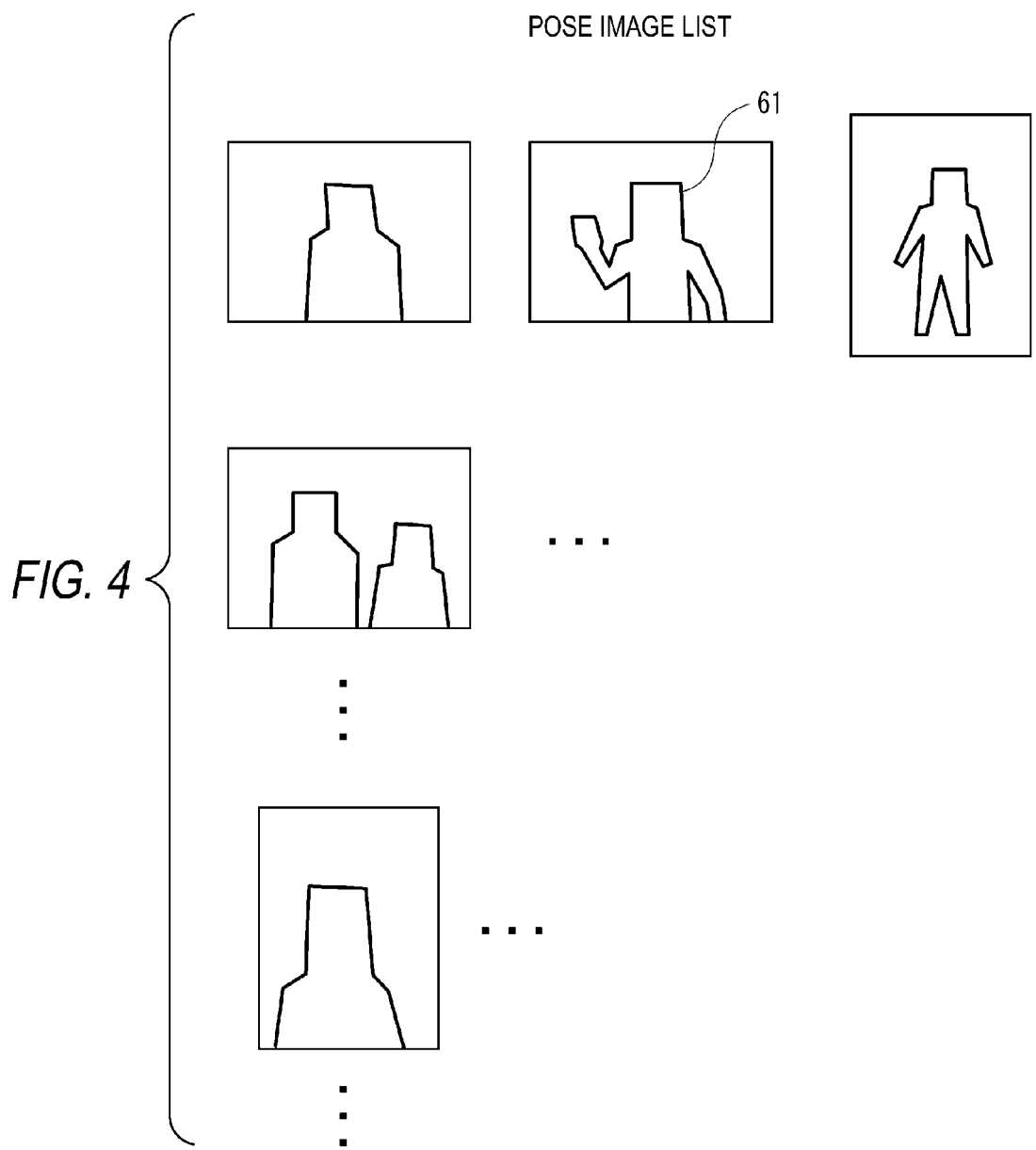
FIG. 4 illustrates a pose image (CG image) which is prepared in advance.

First, the user selects a pose image, which is desired to be photographed as a self-shooting image, from a pose image-list. For example, as illustrated in FIG. 4, among a plurality of previously prepared pose images, any pose image is selected. As for the pose image, for example, various pose images of a whole body or a half body for one person, various pose images for two people, various pose images for three people, are prepared in advance, and among them, a desired pose image is selected. When no desired pose image is present, a handwriting input may be made through, for example, a touch panel provided on the LCD 16 on the rear surface of the camera.

At present, it is assumed that among pose images for one person, a pose image 61 of only an upper body with a right hand representing a V sign is selected (step S1 of FIG. 3). Then, the digital camera 10 captures an image of the subject (a moving image of the user himself located in front of the digital camera 10 placed on, for example, a tripod) as a live view image (a through image) (step S2). In step S3, it is determined whether the camera posture is a horizontal photographing posture or a vertical photographing posture. When the camera posture is the horizontal photographing posture, in the next step S4, the image of the subject is flipped horizontally, and the processing proceeds to step S6. When the camera posture is the vertical photographing posture, the proceeding proceeds from step S3 to step S5, the image of the subject is flipped vertically, and the processing proceeds to step S6.

Figure 5A:
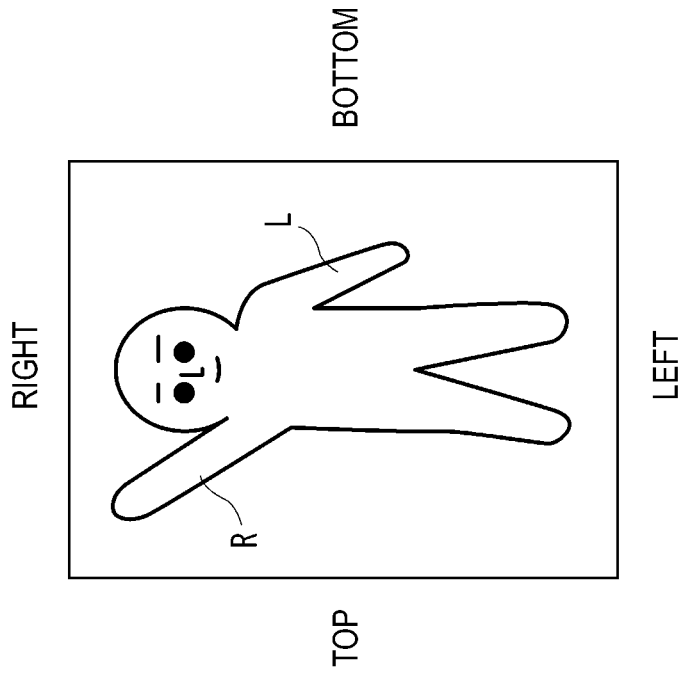
FIGS. 5A and 5B are explanatory views of mirror image conversion of a photographed image.
Figure 5B:
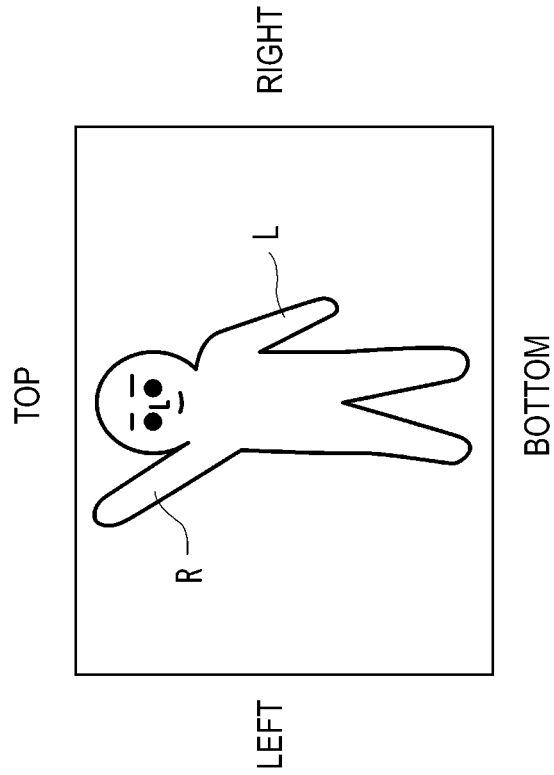

FIG. 5A is a view for explaining horizontal flipping, and FIG. 5B is a view for explaining vertical flipping. When the camera 10 is placed in a horizontal photographing posture, a right hand position R of the subject is photographed at a left side, and a left hand position L is photographed at a right side. When the camera 10 is placed in a vertical photographing posture, a right hand position R of the subject is photographed at a left side (a top side of the camera), and a left hand position L is photographed at a right side (a bottom side of the camera).

Since the photographed image is projected by the projector 17 on, for example, a white wall at the front side (the camera side) in a view from the subject, that is, in the direction opposite (the rear surface side) to the subject photographing direction in a view from the camera 10, the photographed image is converted into a mirror image in step S4 or S5. Accordingly, the user himself/herself is capable of recognizing the projected image as his/her own image reflected on a mirror.

After the photographed image is converted into the mirror image, a pose image is superimposed on the photographed image in step S6. When as the pose image, a pose image, which is converted into the mirror image in advance, is selected, the pose image itself may be superimposed on the photographed image. When the pose image itself is not converted into a mirror image, the pose image is converted into the mirror image and then superimposed on the photographed image. The pose image 61 exemplified in FIG. 4 is a non-mirror image.

Figure 6:
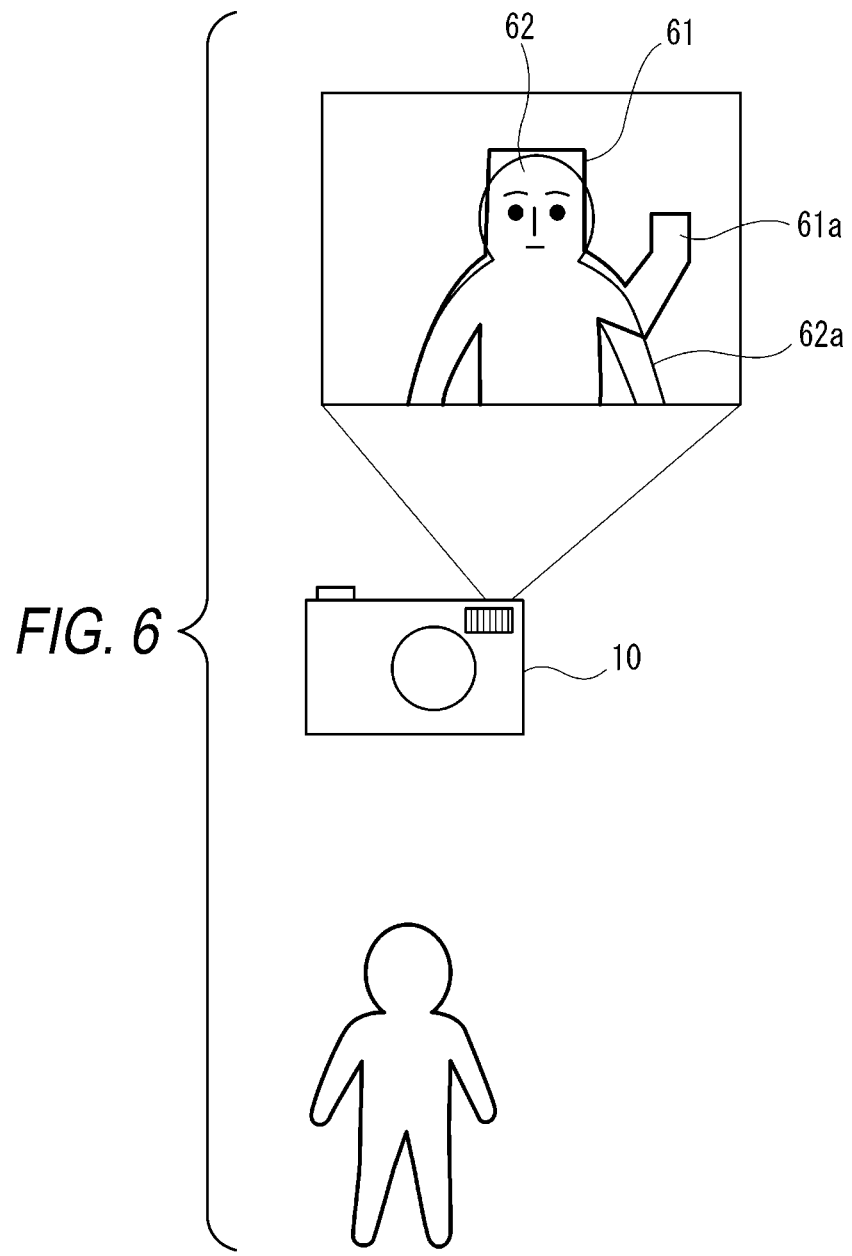
FIG. 6 is an explanatory view of an exemplary projected image.

Then, in step S7, as illustrated in FIG. 6, the pose image 61 superimposed on a photographed image (a through image) 62 is projected by the projector 17 on, for example, a white wall behind the camera. The pose image 61 of FIG. 6 is a mirror image which is obtained through horizontal flipping of the pose image of FIG. 4. In the projected image of FIG. 6, the position of a right hand image 62a of the subject is not yet superimposed on a right hand V sign position 61a of the pose image 61.

Then, in step S8, a detection of a face of the subject is performed. The face detection may be performed by a conventionally known face detecting method, such as, for example, pattern matching. In step S9, it is determined whether the face detection is successful. When the face detection is failed, steps S8 and S9 are repeated until the face detection is successful.

When the face is detected, the processing proceeds from step S9 to step S10, and a subject outline shape including the face is extracted on the basis of the face. Next, in step S11, a superimposition degree (a coincidence degree) indicating how much the outline shape of the subject and the pose image are superimposed on each other is calculated.

Next, in step S12, it is determined whether the superimposition degree calculated in step S11 is a predetermined threshold value or more. When the superimposition degree is low and the determination result in step S12 is negative, the processing proceeds back to step S8 so that re-determination of the superimposition degree is repeated.

The user himself/herself who is self-shooting corrects his/her position or posture to be superimposed on the pose image while seeing the projected image. When the superimposition degree becomes the threshold value or more, the processing proceeds from step S12 to step S13 and an automatic photography is performed. That is, a shutter is automatically pressed, and a still image of the user is actually photographed and recorded in the memory card 26.

In the projected image illustrated in FIG. 6, since the V sign portion of the right hand of the user himself/herself is not superimposed, the superimposition degree is low and thus the automatic photography is not performed. When the user makes a V sign by a right hand to be superimposed on the pose image, the shutter is automatically pressed so that a still image of the subject which is making the V sign by the right hand is actually photographed.

In the above described exemplary embodiment, an automatic photography is immediately performed when the superimposition degree corresponds to the threshold value. However, for example, timer counting until the shutter is pressed may be initiated. When the superimposition degree exceeds the threshold value, for example, a 2-sec timer may be initiated so that the shutter may be pressed after 2 sec.

Figure 7:
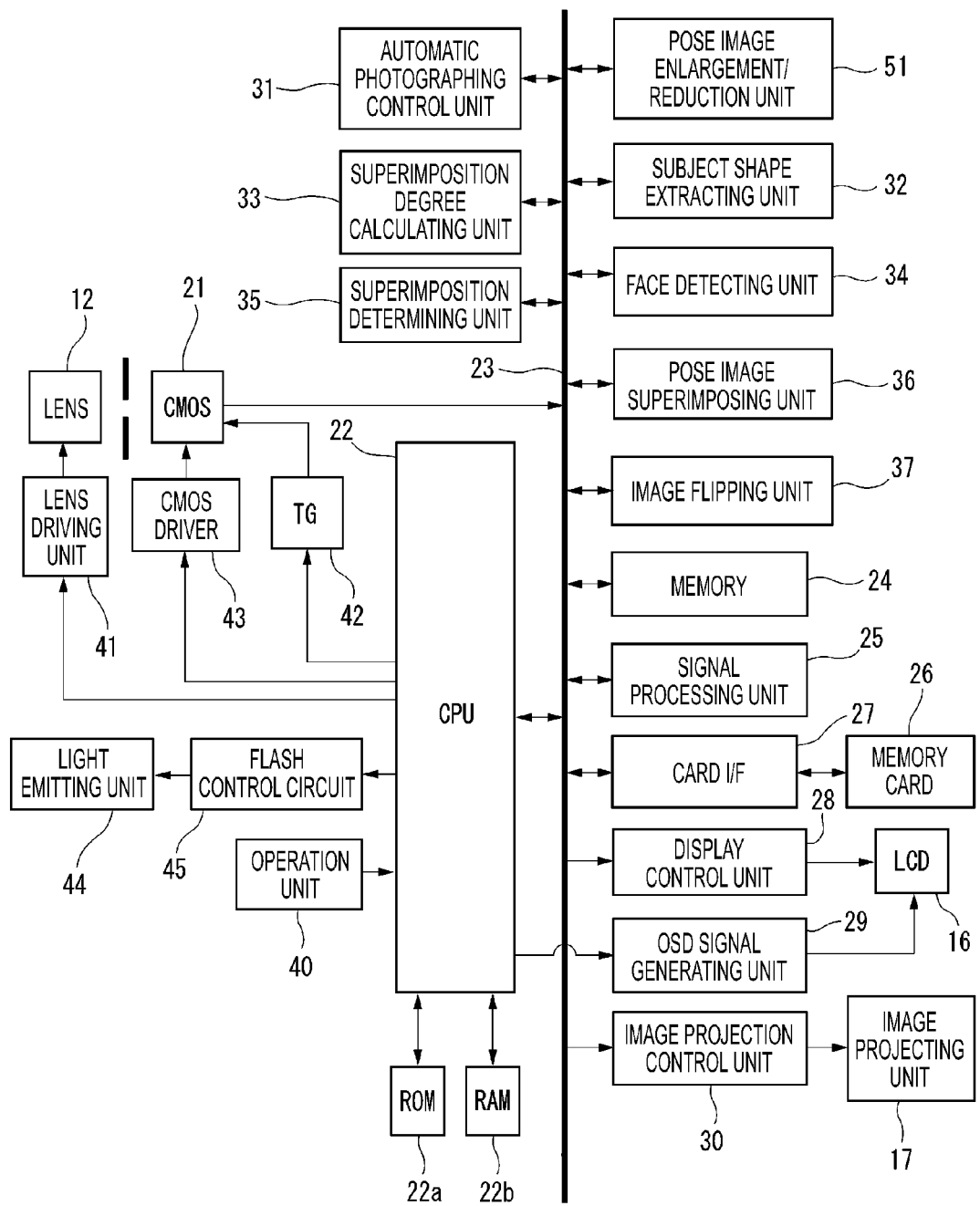
FIG. 7 is a functional block diagram of an imaging apparatus according to a second exemplary embodiment of the present invention.
Figure 8:
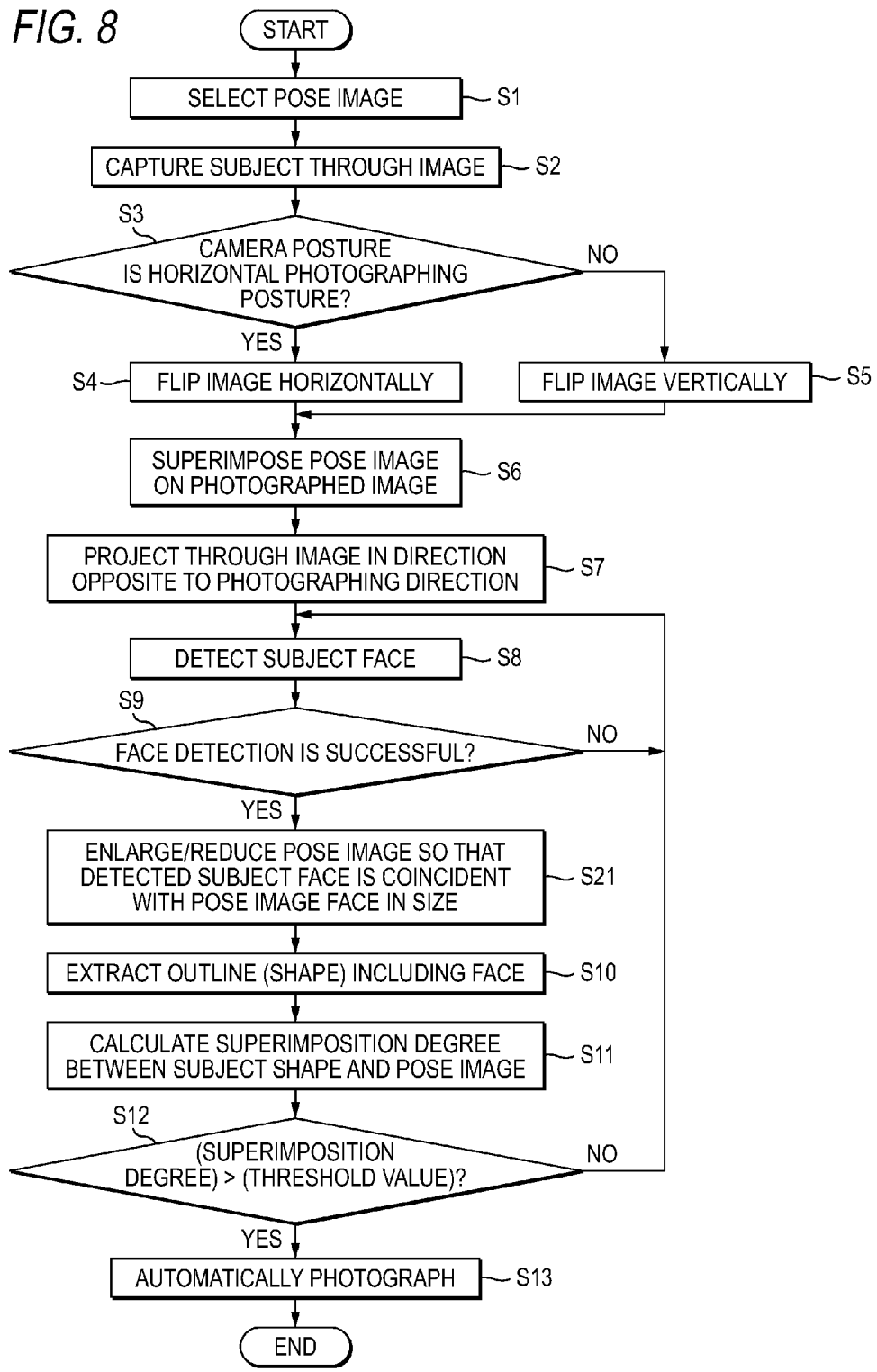
FIG. 8 is a flow chart illustrating a control sequence according to the second exemplary embodiment of the present invention.

FIG. 7 is a functional block diagram according to a second exemplary embodiment, which represents the exemplary embodiment of FIG. 2. FIG. 7 is different from FIG. 2 in that in addition to the configuration of FIG. 2, a pose image enlargement/reduction unit 51 is connected to the bus 23. The pose image enlargement/reduction unit 51 is also a functional block which is implemented when the CPU 22 executes the control program. FIG. 8 is a flow chart illustrating a processing sequence of a control sequence according to the second exemplary embodiment, which represents the exemplary embodiment of FIG. 3. FIG. 8 is different from FIG. 3 in that step S21 is provided between steps S9 and S10 of the flow chart of FIG. 3.

Figure 9:
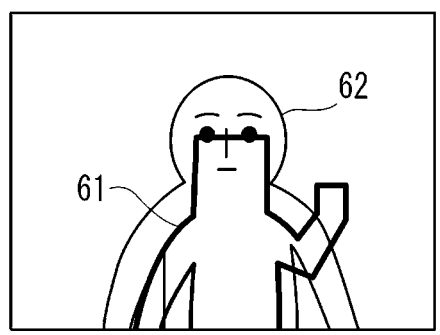
FIG. 9 is an explanatory view of the second exemplary embodiment of the present invention.

As illustrated in FIG. 9, the size of an outline shape 62 of a subject image may not be coincident with the size of a pose image 61. For example, it is assumed that a user places the digital camera 10 on, for example, a tripod and adjusts a zoom magnification of the photographing lens 12 so that a still image of his upper body is photographed with an appropriate size. In this case, when a default size of the pose image is greatly different from the size of the subject image, the superimposition degree may not become the threshold value or more all the time in determination of step S12.

Therefore, the pose image enlargement/reduction unit 51 of FIG. 7 of the second exemplary embodiment performs enlargement and reduction of the pose image in step S21 of FIG. 8 so that the size of the subject image is coincident with the size of the pose image. The enlargement or reduction may be performed to such an extent that the size of the face image of the subject is coincident with the size of a face region of the pose image.

In the exemplary embodiment of FIGS. 7 and 8, the pose image is enlarged or reduced to cope with the size difference. However, in another configuration, the size of the subject image may be enlarged or reduced through automatic adjustment of a zoom magnification of the photographing lens.

Figure 10:
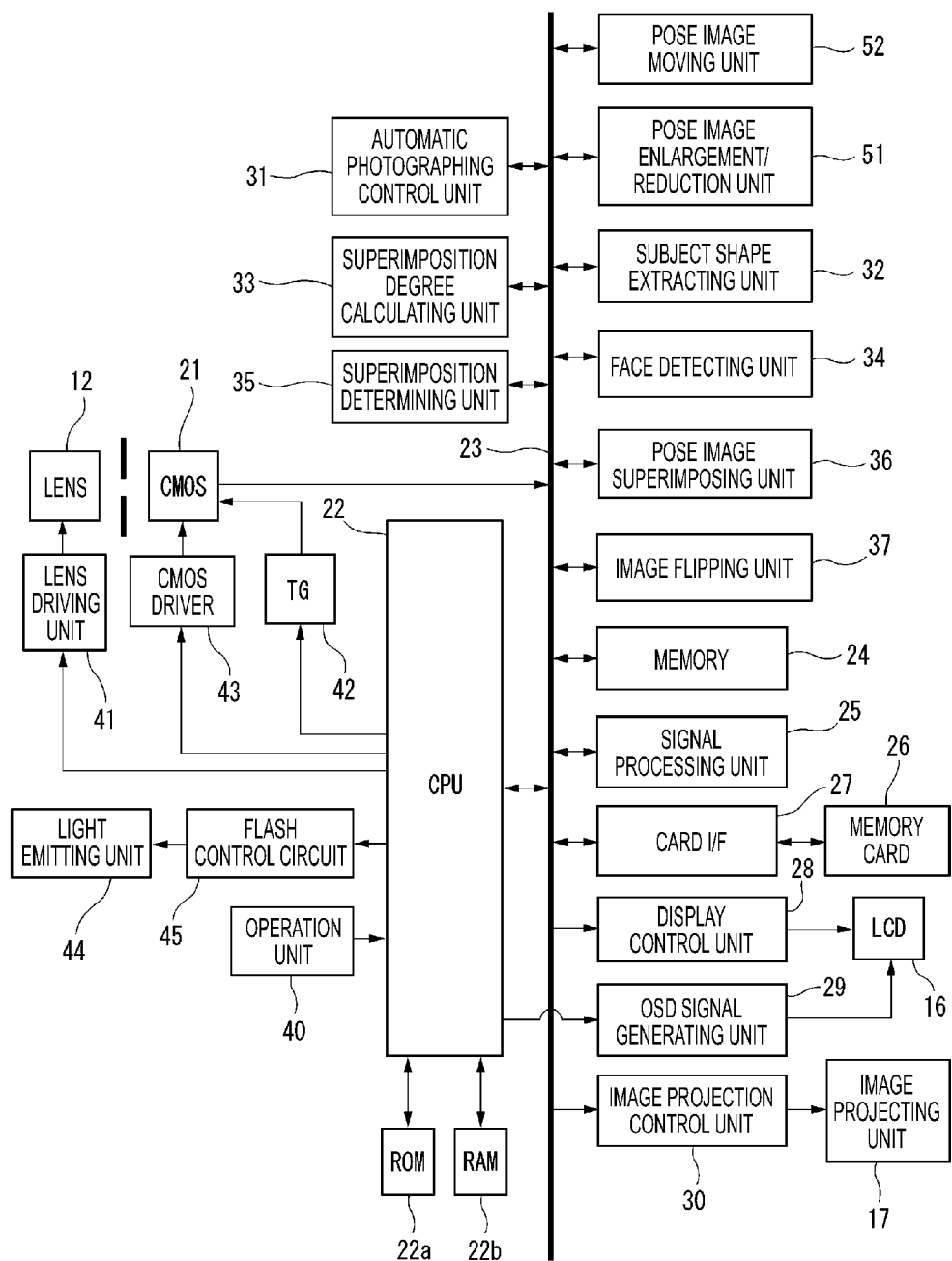
FIG. 10 is a functional block diagram of an imaging apparatus according to a third exemplary embodiment of the present invention.
Figure 11:
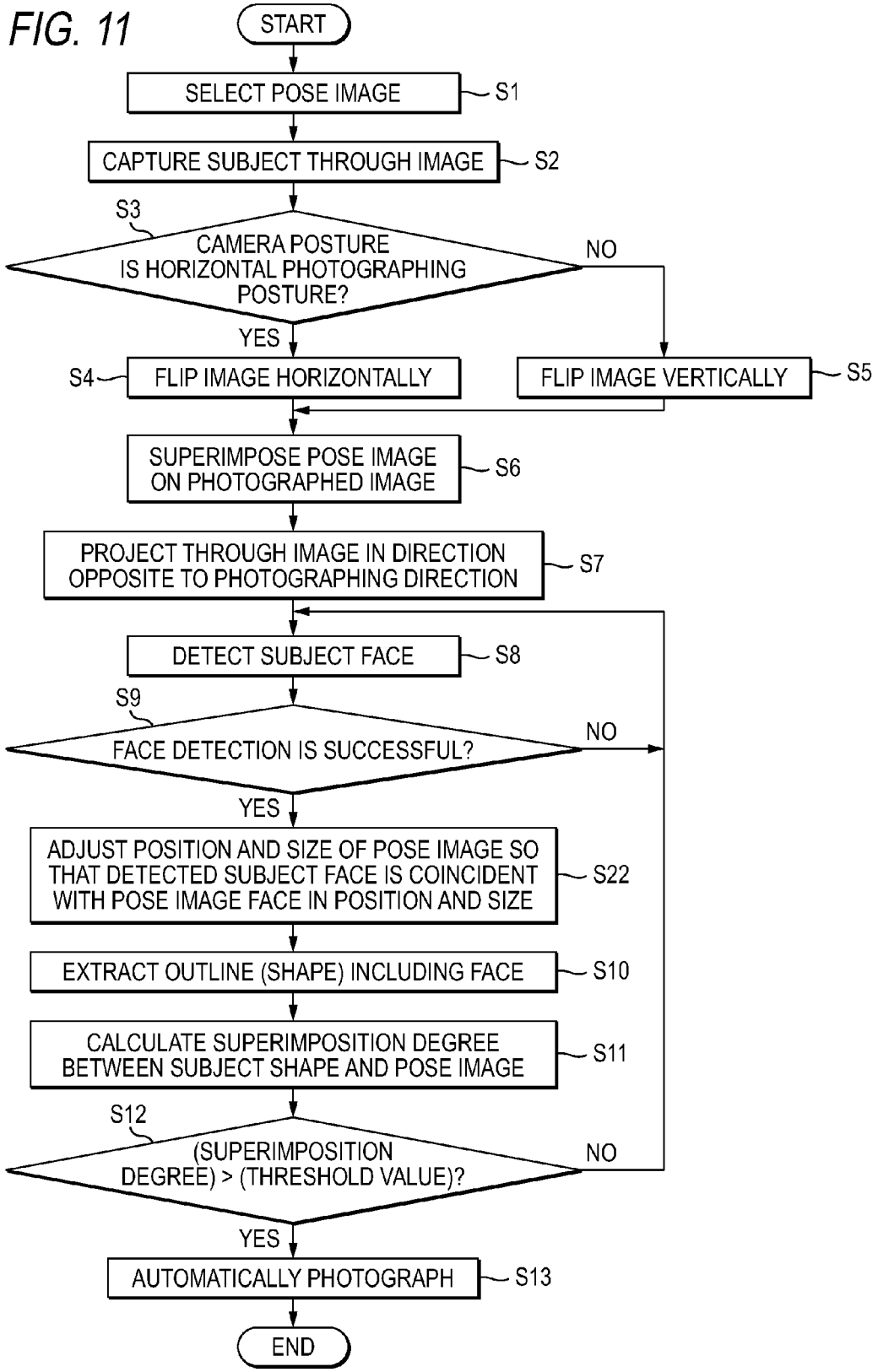
FIG. 11 is a flow chart illustrating a control sequence according to the third exemplary embodiment of the present invention.
Figure 12:
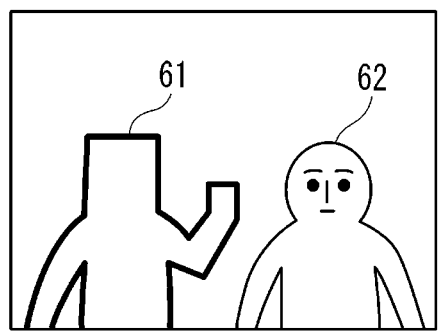
FIG. 12 is an explanatory view of the third exemplary embodiment of the present invention.

FIGS. 10 and 11 are a functional block diagram and a flow chart according to a third exemplary embodiment of the present invention, respectively. In the exemplary embodiment of FIGS. 7 and 8, enlargement or reduction of the pose image or the subject image is performed so that the size of the pose image is coincident with the size of the subject image. However, in actuality, besides the size difference between two images, as illustrated in FIG. 12, a positional deviation on a screen may occur.

Therefore, in the present exemplary embodiment, as illustrated in FIG. 10, a pose image moving unit 52 is provided to the bus 23, and in the flow chart of FIG. 11, step S22 is provided between steps S9 and S10. The pose image moving unit 52 is a functional block which is implemented when the CPU 22 executes the control program.

In step S22, the pose image moving unit 52 obtains the size and the on-screen position of a face image, and the face region size and the on-screen position of a pose image, moves the position of the pose image to correspond to the subject image, and performs the size adjustment of both images in the same manner as in the second exemplary embodiment.

Figure 13:
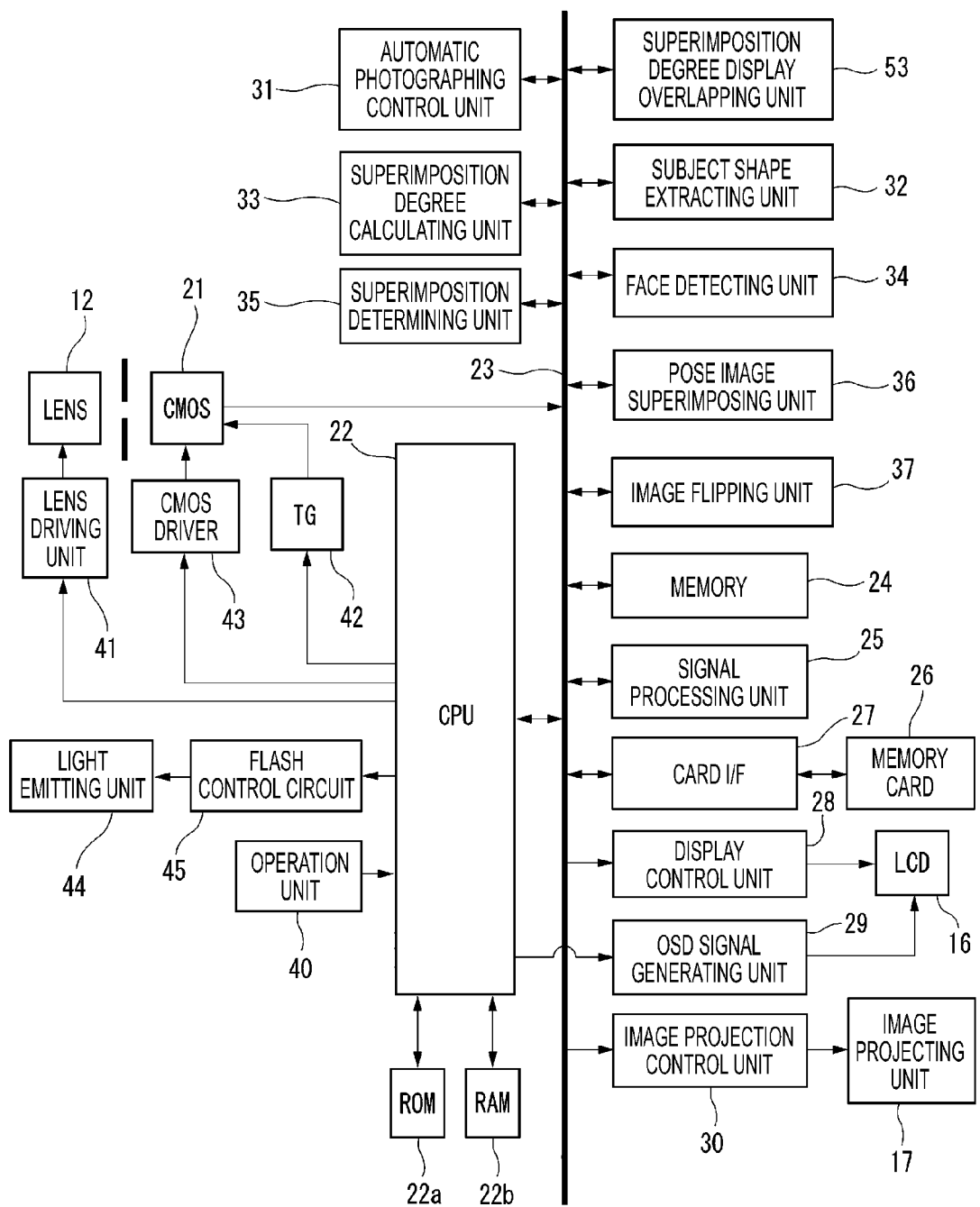
FIG. 13 is a functional block diagram of an imaging apparatus according to a fourth exemplary embodiment of the present invention
Figure 14:
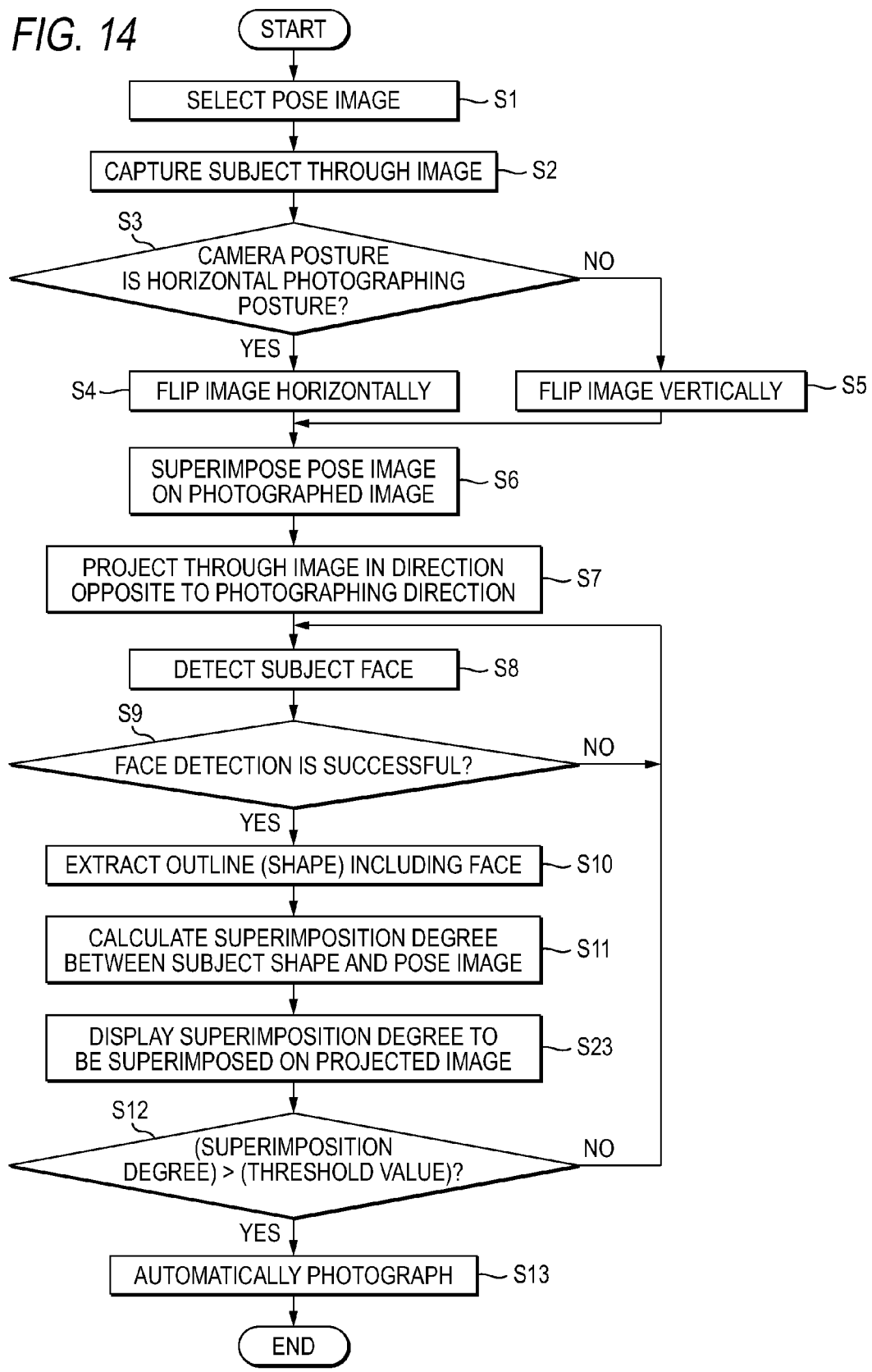
FIG. 14 is a flow chart illustrating a control sequence according to the fourth exemplary embodiment of the present invention.

FIGS. 13 and 14 are a functional block diagram and a flow chart according to a fourth exemplary embodiment of the present invention, respectively. The exemplary embodiment of FIG. 13 is different from that of FIG. 2 in that a superimposition degree display overlapping unit 53 configured to display the superimposition degree at the present moment to overlap a projected image is provided to the bus 23. Of course, the superimposition degree display overlapping unit 53 may be provided in the exemplary embodiments of FIGS. 7 and 10. The superimposition degree display overlapping unit 53 is a functional block which is implemented when the CPU 22 executes the control program.

FIG. 14 is a flow chart of a control program of the present exemplary embodiment. In the present exemplary embodiment, between steps S11 and S12, step S23 is provided in which the superimposition degree display overlapping unit 53 displays the superimposition degree at the present moment to overlap the projected image.

Figure 15:
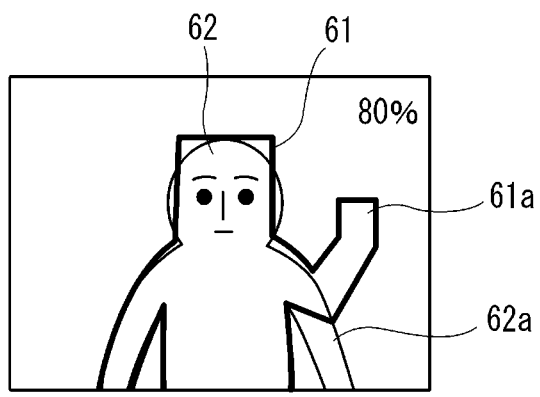
FIG. 15 is an explanatory view of a superimposition degree (a coincidence degree) according to the fourth exemplary embodiment of the present invention, which is displayed by numerical values.

FIG. 15 is a view illustrating an exemplary projected image in which a superimposition degree at the present moment is displayed by numerical values. When seeing these values, a user may correct his/her posture so that the superimposition degree is greater than the threshold value (e.g., the superimposition degree 85%). When the superimposition degree is greater than the threshold value, and a self-timer of the shutter starts, a change of the display of the superimposition degree may be made so that a countdown of a self-time is displayed.

Figure 16:
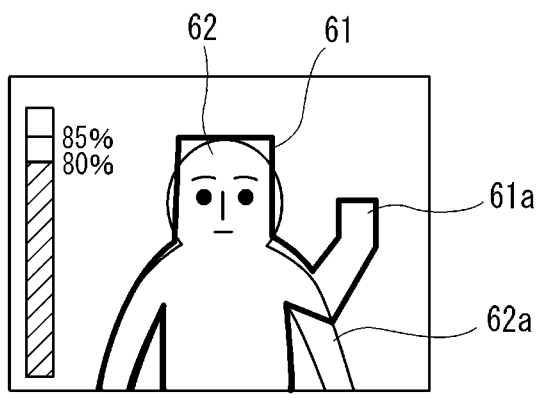
FIG. 16 is an explanatory view of a superimposition degree (a coincidence degree) according to the fourth exemplary embodiment of the present invention, which is displayed by a bar graph.

FIG. 16 is a view illustrating an exemplary projected image in which a superimposition degree is displayed by a bar graph. The user may visually determine whether his/her posture is coincident with the pose image by comparing the position of the bar graph at threshold value 85% to the present position at superimposition degree 80% which goes up and down according to the posture.

The threshold value of the superimposition degree used for determination in step S12 may be a value set by the user himself/herself instead of a default value. For example, when the pose image is selected in step S1, the threshold value may also be set.

Figure 17:
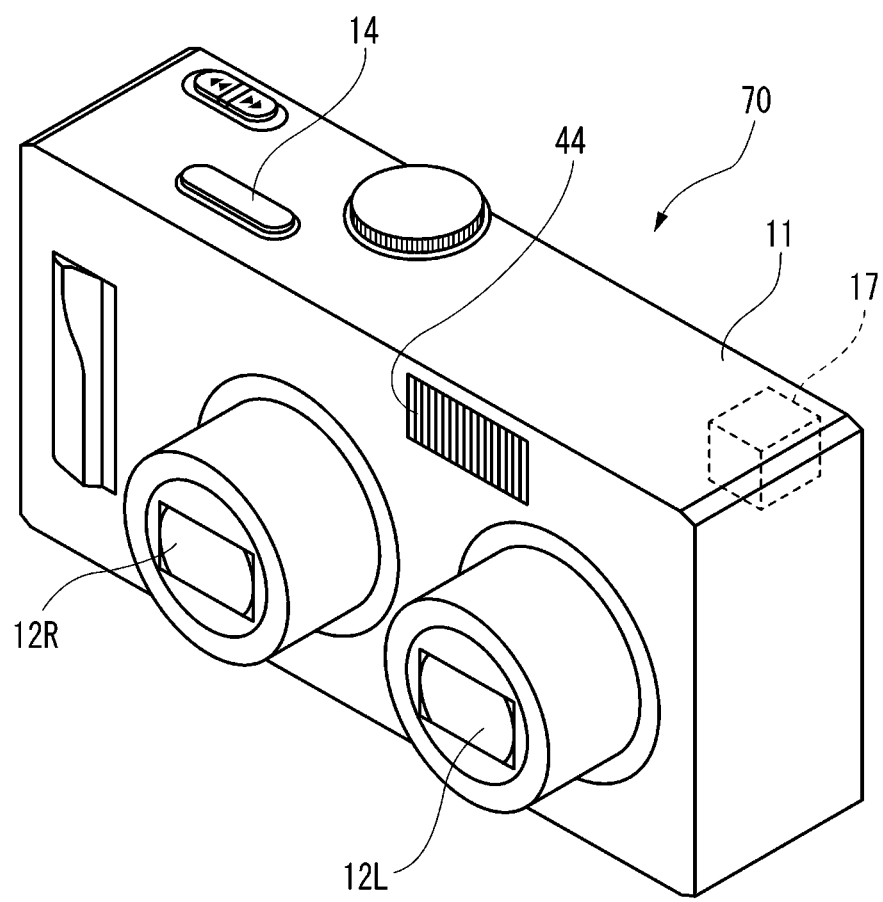
FIG. 17 is an external perspective view of an imaging apparatus according to a fifth exemplary embodiment of the present invention.

FIG. 17 is an external perspective view of a digital camera 70 according to a fifth exemplary embodiment of the present invention. The digital camera 10 illustrated in FIG. 1 is a monocular camera, but in the present exemplary embodiment, the digital camera 70 is a two-lens digital camera for photographing a stereoscopic image is used. In the present exemplary embodiment, the projector 17 is also provided to project an image to the camera rear surface side.

Figure 18:
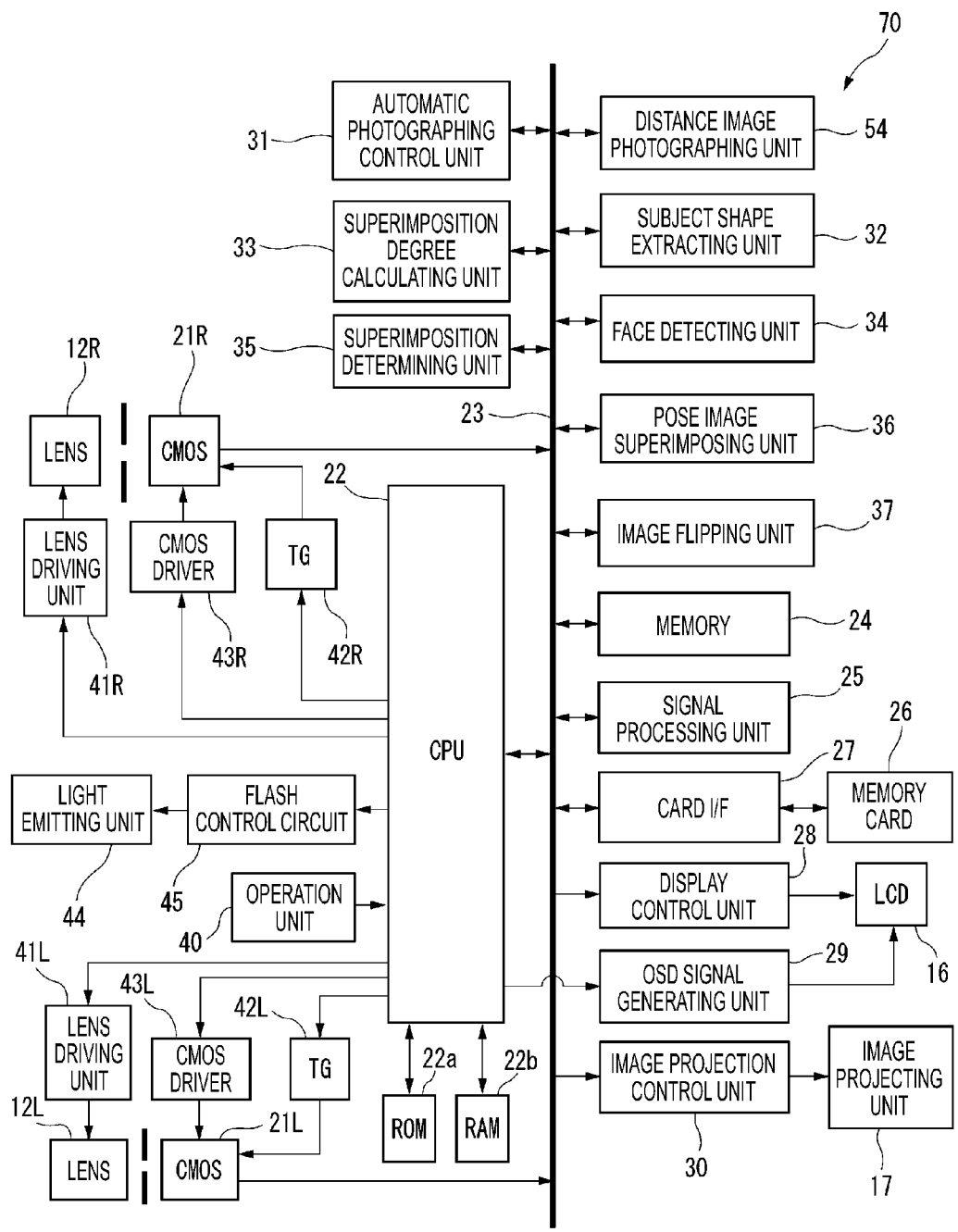
FIG. 18 is a functional block diagram of the imaging apparatus according to the fifth exemplary embodiment of the present invention.

The functional block diagram of the digital camera 70 of FIG. 17 is illustrated in FIG. 18. The basic configuration is the same as that of FIG. 2, and respective units of an imaging system provided in a right eye photographing lens 12R are given the same number references as those in FIG. 2 which are followed by "R", and respective units of an imaging system provided in a left eye photographing lens 12L are given the same number references as those in FIG. 2 which are followed by "L". In the present exemplary embodiment, the bus 23 is connected to a distance image photographing unit 54.

The stereoscopic camera 70 for photographing a stereoscopic image is capable of identifying a distance to a subject with a high precision as compared to a monocular camera. By using this function, the control program of FIG. 19 is executed.

Figure 19:
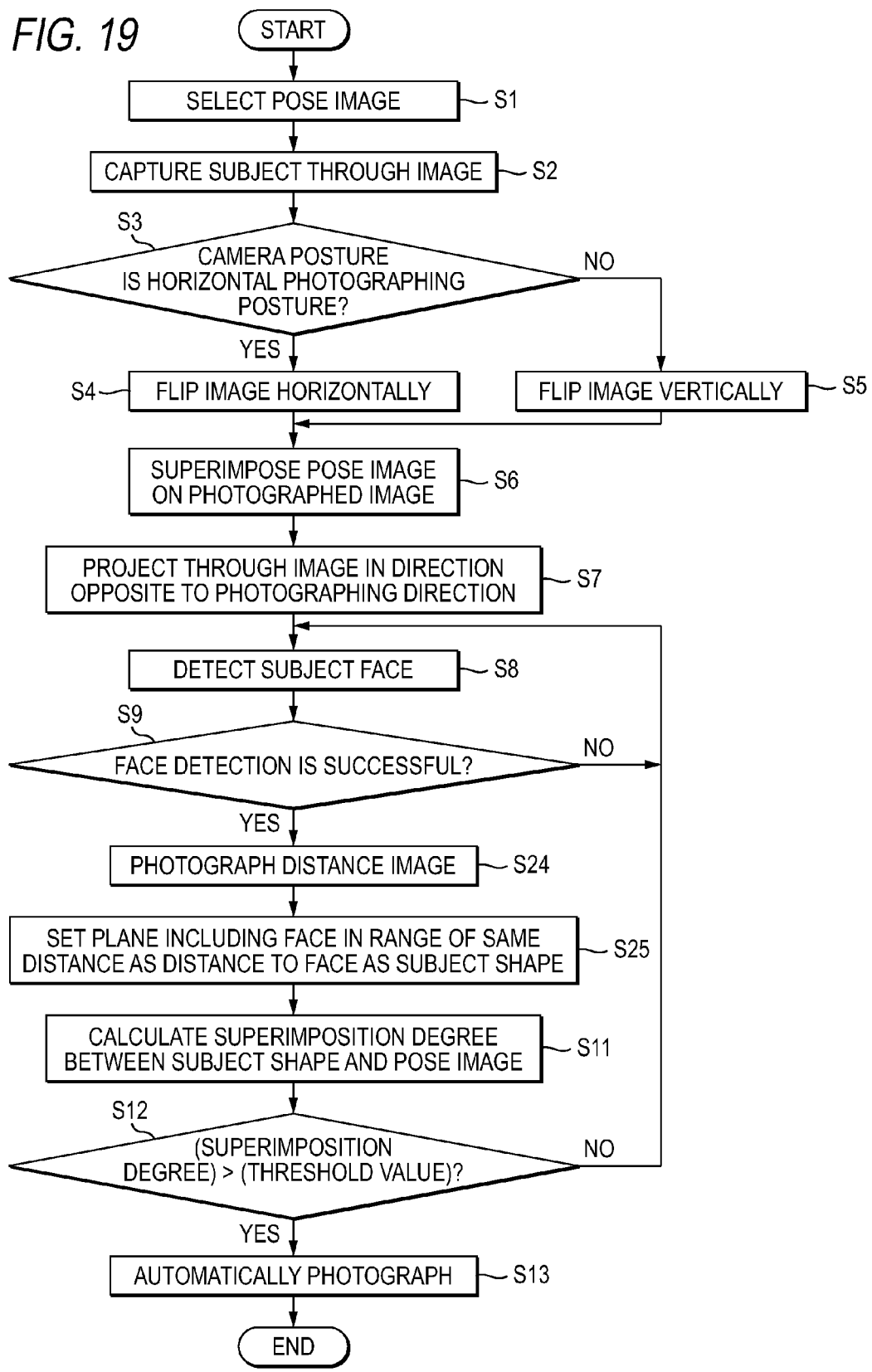
FIG. 19 is a flow chart illustrating a control sequence according to the fifth exemplary embodiment of the present invention.

In the flow chart of FIG. 19, instead of step S10 in the flow chart of FIG. 3, steps S24 and S25 are executed. That is, in step S24, photographing of a distance image (a stereoscopic image) is performed, and in step S25, a plane including a face in a range of the same distance as a distance to the face is set as a subject shape.

A "subject" of a camera refers to everything projected on the camera. In self shooting, a user himself/herself becomes a main subject among the subjects, and is required to be distinguished from a background subject. In step S10 of FIG. 3, an outline of a subject detected as a face of a main subject is extracted and set as an outline shape of the main subject. However, when a background image or a front side image is complicated, the outline shape of the main subject may not be extracted with a high precision.

In a digital camera for photographing a stereoscopic image, a distance of each subject from the camera may be measured from a photographed image. Accordingly, when a face is detected, a subject in a range of the same distance as a distance to the face (a subject present at the same distance as a distance from the digital camera to the face) may be set as a main subject, and an outline shape of the subject may be extracted so that the outline shape of the main subject may be distinguishable with a high precision from, for example, the background image. Accordingly, it is possible to compare the outline shape of the main subject with the pose image with a high precision.

In this exemplary embodiment, the two-lens digital camera for photographing a stereoscopic image is described as an example. However, as disclosed in, for example, Japanese Patent Laid-Open Publication No. 2012-15820, it is natural that a monocular camera for photographing a stereoscopic image may be employed.

In the exemplary embodiment described in FIGS. 3 and 6, it has been described that an automatic photography is performed when a subject shape of a V sign portion is coincident with a pose image. However, in the present exemplary embodiment, a subject (a user) himself/herself may control the moment a shutter is pressed or a timer is started, by his/her right hand.

Figure 20:
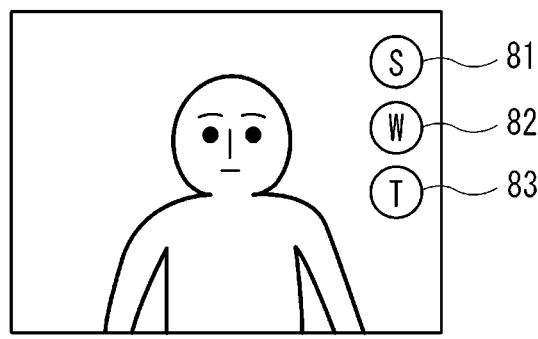
FIG. 20 is an explanatory view of a projected image according to a further exemplary embodiment of the present invention.

Another configuration in which only this control function is used may be adopted. For example, apart from a pose image, as illustrated in the projected image of FIG. 20, an icon image 81 of a shutter release button may be displayed on the projected image, and a self-time may be started when a portion recognized as an outline shape of a main subject is moved on a screen to touch the icon image 81.

Likewise, an icon image 82 of a wide-side zoom button of a zoom lens or an icon image 83 of a remote-side zoom button may be displayed to be superimposed on the projected image so that the user himself may touch the icon images 82 and 83 to operate the zoom position.

In self-shooting of a user, it is complicated that the user comes back to a camera location and makes settings again every time one photo is taken. Thus, when required operation button icons are displayed to be superimposed on the projected image, convenience is improved. In the self-shooting, the number of photos to be taken may be set in advance. However, for example, when a re-photographing button icon is displayed to be superimposed, a photographer does not need to come back to the camera location whenever checking a photographed image by projecting the image to, for example, a white wall of the rear side by the projector 17.

In the above-described exemplary embodiments, photography for recording a still image of a subject is referred to as "actual photography." However, the actual photography may be employed in a case of recording a moving image. For example, when a user (a main subject) touches the switch icon 81 of FIG. 20 as a trigger for initiating photography of the moving image, the photography for recording the moving image may be initiated as the actual photography.

A digital camera has been described as an imaging apparatus according to exemplary embodiments of the present invention, but the configuration of the imaging apparatus is not limited thereto. Other imaging apparatuses according to the present invention may be, for example, an internal or external PC camera, or a portable terminal device having a photography function, as described above.

A portable terminal device as an exemplary imaging apparatus of the present invention may be, for example, a mobile phone, a smart phone, a PDA (Personal Digital Assistants), or a portable game machine. Hereinafter, as an example, the smart phone will be described in detail with reference to drawings.

Figure 21:
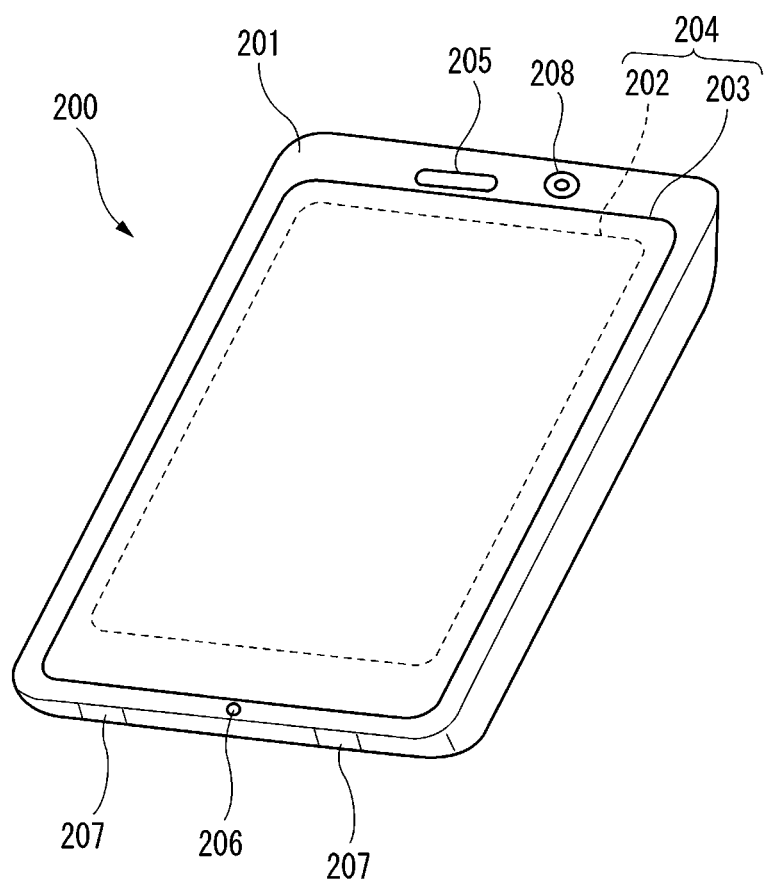
FIG. 21 is an external perspective view of an imaging apparatus according to the further exemplary embodiment of the present invention.

FIG. 21 illustrates an external appearance of a smart phone 200 as an exemplary imaging apparatus of the present invention. The smart phone 200 illustrated in FIG. 21 includes a flat-platy case 201, and a display input unit 204 on one-side surface of the case 201. The display input unit 204 includes a display panel 202 as a display unit, and an operation panel 203 as an input unit, which are integrated with each other. The case 201 includes a speaker 205, a microphone 206, an operation unit 207, and a camera unit 208. Meanwhile, the configuration of the case 201 is not limited to this. For example, it is possible to employ other configurations in which a display unit and an input unit are separate, or a folding structure or a sliding mechanism is included. Although not illustrated in FIG. 21, as in FIG. 1, a projector 17 (see FIG. 22) is provided to project a through image to the rear surface side.

Figure 22:
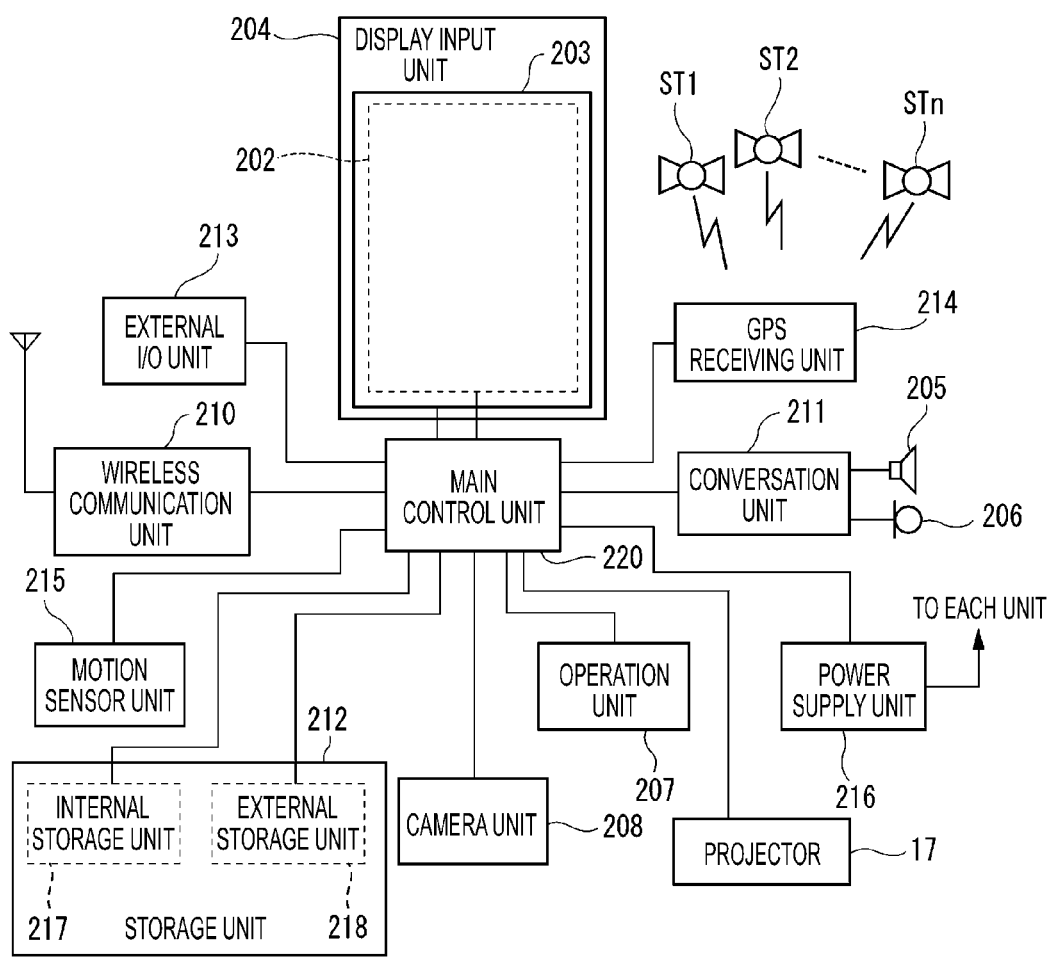
FIG. 22 is a functional block diagram of the imaging apparatus illustrated in FIG. 21.

FIG. 22 is a block diagram illustrating the configuration of the smart phone 200 illustrated in FIG. 21. As illustrated in FIG. 22, main elements of the smart phone include a wireless communication unit 210, the display input unit 204, a conversation unit 211, the operation unit 207, the camera unit 208, a storage unit 212, an external I/O unit 213, a GPS (Global Positioning System) receiving unit 214, a motion sensor unit 215, a power supply unit 216, and a main control unit 220. The smart phone 200 has, as a main function, a wireless communication function in which a mobile radio communication is performed through a base station device BS (not illustrated) and a mobile communication network NW (not illustrated).

The wireless communication unit 210 performs a radio communication in relation to the base station device BS accommodated in the mobile communication network NW under the instruction of the main control unit 220. By using the radio communication, reception and transmission of various file data such as audio data or image data, and e-mail data, and reception of web data or streaming data are performed.

The display input unit 204 is a so-called touch panel which displays, for example, an image (a still image or a moving image) or text information to visually provide information to a user, and detects the user's operation on the displayed information under the control of the main control unit 220. The display input unit 204 includes the display panel 202 and the operation panel 203.

The display panel 202 uses, for example, a liquid crystal display (LCD), or an organic electro-luminescence display (OELD) as a display device. The operation panel 203 is a device which is mounted so that an image displayed on a display surface of the display panel 202 is recognizable, and configured to detect one or more coordinates operated by a finger of a user or a stylus. When the device is operated by the finger of the user or the stylus, a detection signal generated due to the operation is output to the main control unit 220. Then, the main control unit 220 detects an operation location (a coordinate) on the display panel 202 based on the received detection signal. The main control unit 220 is connected to the projector 17.

As illustrated in FIG. 21, in the smart phone 200 as an exemplary imaging apparatus of the present invention, the display panel 202 and the operation panel 203 are integrated to constitute the display input unit 204, in which the operation panel 203 is disposed to completely cover the display panel 202. When such a disposition is employed, the operation panel 203 may serve to detect the user's operation even in a region outside the display panel 202. That is, the operation panel 203 may have one region for detecting a portion overlapping the display panel 202 (hereinafter, referred to as a display region), and the other region for detecting a periphery portion not overlapping the display panel 202 (hereinafter, referred to as a non-display region).

Meanwhile, the size of the display region and the size of the display panel 202 may completely match each other, but do not have to necessarily match each other. The operation panel 203 may have two sensing regions including an outer region and an inner region. The width of the outer region is properly designed according to, for example, the size of the case 201. As a location detecting method, for example, a matrix switch method, a resistance film method, a surface acoustic wave method, an infrared method, an electromagnetic induction method, or an electrostatic capacitance method may be employed in the operation panel 203, or other methods may be employed.

The conversation unit 211 includes the speaker 205 or the microphone 206. The conversation unit 211 converts a user voice input through the microphone 206 into audio data processable in the main control unit 220 and outputs the audio data to the main control unit 220, or decodes the audio data received by the wireless communication unit 210 or the external I/O unit 213, and outputs the decoded audio data from the speaker 205. As illustrated in FIG. 21, for example, the speaker 205 may be mounted at the same plane as the surface where the display input unit 204 is provided, and the microphone 206 may be mounted at the side surface of the case 201.

The operation unit 207 is a hardware key using, for example, a key switch, and receives an instruction from a user. For example, as illustrated in FIG. 21, the operation unit 207 is a push button-type switch mounted on the side surface of the case 201 of the smart phone 200, which is turned on by being pressed by, for example, a finger, and is turned off by a restoring force of, for example, a spring when the finger is released.

The storage unit 212 stores a control program or control data of the main control unit 220, application software, address data corresponding to a name or a phone number of a communication partner, data of sent and received e-mail, web data downloaded through web browsing, or downloaded contents data, and temporarily stores, for example, streaming data. The storage unit 212 is constituted by an internal storage unit 217 embedded within a smart phone, and an external storage unit 218 having a detachable external memory slot. Each of the internal storage unit 217 and the external storage unit 218 which constitute the storage unit 212 is implemented using a storage medium such as, a flash memory type memory, a hard disk type memory, a multimedia card micro type memory, a card type memory (e.g., a micro SD (registered trademark) memory), a RAM (Random Access Memory), and a ROM (Read Only Memory).

The external I/O unit 213 serves as an interface with all external devices connected to the smart phone 200, and is configured to directly or indirectly connect to other external devices through, for example, a communication (e.g., universal serial bus (USB), or IEEE1394) or a network (e.g., internet, wireless LAN, Bluetooth (registered trademark), Radio Frequency Identification (RFID), Infrared Data Association (IrDA) (registered trademark), Ultra Wide Band (UWB) (registered trademark), ZigBee (registered trademark)).

Examples of the external devices connected to the smart phone 200 may include a wired/wireless headset, a wired/wireless external charger, a wired/wireless data port, a memory card or a SIM (Subscriber Identity Module)/UIM (User Identity Module) card connected through a card socket, an external audio/video device connected through an audio/video I/O (Input/Output) terminal, a wirelessly connected external audio/video device, a wired/wirelessly connected smart phone, a wired/wirelessly connected PC, a wired/wirelessly connected PDA, and an earphone. The external I/O unit 213 may allow data transmitted from these external devices to be transmitted to each component within the smart phone 200, or data within the smart phone 200 to be transmitted to the external devices.

The GPS receiving unit 214, under an instruction of the main control unit 220, receives GPS signals transmitted from GPS satellites ST1 to STn, and executes a positioning calculation process based on the plurality of received GPS signals to detect a location of the smart phone 200 which is constituted by a latitude, a longitude, and an altitude. The GPS receiving unit 214 may detect a location using position information when the position information can be acquired from the wireless communication unit 210 or the external I/O unit 213 (e.g., a wireless LAN).

The motion sensor unit 215 includes, for example, a three-axis acceleration sensor, and detects a physical movement of the smart phone 200 under an instruction of the main control unit 220. When the physical movement of the smart phone 200 is detected, a direction or an acceleration of movement of the smart phone 200 is detected. This detection result is output to the main control unit 220.

The power supply unit 216, under an instruction of the main control unit 220, supplies power accumulated in a battery (not illustrated) to each unit of the smart phone 200.

The main control unit 220 includes a microprocessor and operates according to a control program or control data stored in the storage unit 212 to generally control respective units of the smart phone 200. The main control unit 220 has a mobile communication control function for controlling respective units of a communication system in order to perform voice communication or data communication through the wireless communication unit 210, and an application processing function.

The application processing function is implemented when the main control unit 220 is operated according to application software stored in the storage unit 212. Examples of the application processing function may include an infrared communication function for performing data communication with the opposing device by controlling the external I/O unit 213, an e-mail function for transmitting and receiving e-mails, and a web browsing function for reading web pages.

The main control unit 220 also includes an image processing function such as displaying of a video on the display input unit 204, based on image data (data of a still image or a moving image) of, for example, received data or downloaded streaming data. The image processing function refers to a function performed by the main control unit 220 in which the image data are decoded, and the decoded data are subjected to an image processing to display an image on the display input unit 204.

Further, the main control unit 220 executes a display control on the display panel 202, and an operation detection control for detecting a user operation through the operation unit 207 and the operation panel 203. When the display control is executed, the main control unit 220 displays an icon for starting application software, or a software key such as, for example, a scroll bar, or displays a window on which an e-mail is to be written. The scroll bar refers to a software key configured to receive an instruction for moving a display portion of an image in a case, for example, a large image which cannot be included in the display region of the display panel 202.

When the operation detection control is executed, the main control unit 220 detects the user's operation through the operation unit 207, receives an operation on the icon, or input of a character string into an input section of the window through the operation panel 203, or receives a scrolling requirement of a displayed image through the scroll bar.

Also, the main control unit 220 has a touch panel control function so that when the operation detection control is executed, the main control unit 220 determines whether an operation location on the operation panel 203 is a portion overlapping the display panel 202 (a display region), or a periphery portion not overlapping the display panel 202 (a non-display region), and controls sensing regions of the operation panel 203 or a display location of the software key.

The main control unit 220 may detect a gesture operation on the operation panel 203, and execute a predetermined function according to the detected gesture operation. The gesture operation does not refer to a conventional simple touch operation, but to an operation of drawing a trail by, for example, a finger, simultaneously specifying a plurality of locations, or drawing a trail for at least one from a plurality of locations by combining these two operations.

The camera unit 208 is a digital camera which electronically photographs an image by using an imaging device such as a CMOS (Complementary Metal Oxide Semiconductor) or a CCD (Charge-Coupled Device). The camera unit 208, under the control of the main control unit 220, may convert image data obtained by photographing into image data compressed in, for example, JPEG (Joint Photographic coding Experts Group) so as to store the compressed image data in the storage unit 212, or output the compressed image data through the I/O unit 213 or the wireless communication unit 210. In the smart phone 200 illustrated in FIG. 21, the camera unit 208 is mounted in the same plane as the surface where the display input unit 204 is provided, but the location where the camera unit 208 is mounted is not limited thereto. The camera unit 208 may be mounted on the rear surface of the display input unit 204. Also, a plurality of camera units 208 may be mounted. When the plurality of camera units 208 are mounted, a camera unit 208 provided for photography may be switched to solely take a photograph, or the plurality of camera units 208 may be simultaneously used for photography.

The camera unit 208 may be used for various functions of the smart phone 200. For example, the image obtained by the camera unit 208 may be displayed on the display panel 202, or the image of the camera unit 208 may be used as one operation input for the operation panel 203. When the GPS receiving unit 214 detects a location, the location may be detected by referring to the image from the camera unit 208. Further, while referring to the image from the camera unit 208, determination on the optical axis direction of the camera unit 208 of the smart phone 200, or determination on a current usage environment may be performed without using the three-axis acceleration sensor, or in conjunction with the three-axis acceleration sensor. Of course, the image from the camera unit 208 may be used within the application software.

Further, the image data of the still image or the moving image may be added with, for example, position information acquired by the GPS receiving unit 214, audio information acquired by the microphone 206 (which may be converted into text information through voice-to-text conversion by, for example, the main control unit), or posture information acquired by the motion sensor unit 215 and then stored in the storage unit 212, or output through the I/O unit 213 or the wireless communication unit 210.

When the smart phone 200 is fixed to a fixing stand such as, for example, a tripod, to perform self-shooting, it is possible to photograph an image of any pose without a failure by projecting a through image backward as in the exemplary embodiments as described above.

Separate exemplary embodiments have been described, but a plurality of exemplary embodiments may be combined with each other. For example, the smart phone may have a stereoscopic camera embedded therein, in which enlargement or reduction and movement of a pose image may be performed by a camera for photographing a stereoscopic image according to the fifth exemplary embodiment.

As discussed above, the present description discloses the following.

(1) It is an imaging apparatus having a projector, including: an imaging unit that photographs a subject; a mirror image converting unit that converts a live view image photographed by the imaging unit into a mirror image; a projector that projects the mirror image of the live view image in a direction opposite to a photographing direction of the imaging unit; a control unit that initiates actual photography for recording the subject by the imaging unit when a posture of a main subject satisfies a predetermined condition; and a pose image superimposing unit that superimpose a pose image on a projected image, in which the control unit determines that the predetermined condition is satisfied and performs the actual photography when a superimposition degree of the main subject in the projected image and the pose image is a threshold value or more, and the control unit extracts an outline shape of the main subject in the projected image, and performs enlargement and reduction of the mirror image of the live view image of the subject or the pose image so that a size of the outline shape is coincident with a size of the pose image.

(2) It is the imaging apparatus of (1), in which the control unit determines a coincidence degree of the outline shape and the pose image as the superimposition degree.

(3) It is the imaging apparatus of (1) or (2), in which the control unit detects a face image included in the live view image, and extracts the outline shape based on the face image.

(4) It is the imaging apparatus of any one of (1) to (3), in which the control unit performs superimposition so that a position of the outline shape on the projected image is coincident with a position of the pose image on the projected image.

(5) It is the imaging apparatus of any one of (1) to (4), in which the imaging unit photographs a stereoscopic image, and the outline shape is extracted from a subject which is detected using the stereoscopic image and present at the same distance from the imaging apparatus.

(6) It is the imaging apparatus of any one of (1) to (5), in which the control unit displays information indicating the superimposition degree to be superimposed on the projected image.

(7) It is the imaging apparatus of (6), in which the control unit displays the information indicating the superimposition degree and a value of the threshold value to be superimposed on the projected image.

(8) It is an imaging apparatus having a projector, including: an imaging unit that photographs a subject; a mirror image converting unit that converts a live view image of the subject photographed by the imaging unit into a mirror image; a projector that projects the mirror image of the live view image in a direction opposite to a photographing direction of the imaging unit; and a control unit that initiates actual photography for recording the subject by the imaging unit when a posture of a main subject satisfies a predetermined condition, in which the control unit determines that the predetermined condition is satisfied and performs the actual photography when a portion of the mirror image of an outline shape of the main subject extracted from the live view image is superimposed on a predetermined position within a projection screen to which the mirror image of the live view image is projected.

(9) It is the imaging apparatus of (8), in which an icon image indicating an operation button by which a photography operation is performed is projected on the predetermined position by the projector.

(10) It is the imaging apparatus of (9), in which the control unit determines that a corresponding photography operation is input and performs an operation of the imaging apparatus when a portion of the outline shape is superimposed on the projected icon image.

(11) It is the imaging apparatus of any one of (1) to (10), in which the control unit performs the actual photography immediately when the predetermined condition is satisfied.

(12) It is the imaging apparatus of any one of (1) to (10), in which the control unit initiates timer counting until the actual photography when the predetermined condition is satisfied.

(13) It is a method of controlling an imaging apparatus having a projector, including: photographing a subject by an imaging unit; converting a live view image of the subject photographed by the imaging unit into a mirror image; projecting the mirror image of the live view image in a direction opposite to a photographing direction of the imaging unit by a projector; superimposing a pose image on a projected image; initiating actual photography for recording the subject by the imaging unit when a posture of a main subject satisfies a predetermined condition; extracting an outline shape of the main subject in the projected image; and performing enlargement and reduction of the mirror image of the live view image of the subject or the pose image so that a size of the outline shape is coincident with a size of the pose image.

In the above described exemplary embodiments, a photography operation may be made by moving a posture of an image of a main subject projected by a projector. Thus, the usefulness of a projector function is increased, and the usability of the projector function is also improved.

An imaging apparatus having a projector according to the present invention may project an image with high usefulness, and is excellent in usability. Thus, it is useful to distribute the imaging apparatus having a projector.

The present invention has been described by specific exemplary embodiments, but is not limited thereto. Various modifications may be made within the technical spirit of the disclosed invention.

The present application is based on Japanese Patent Application (No. 2012-56012) filed on Mar. 13, 2012, the contents of which are incorporated herein.

What is claimed is:

1. An imaging apparatus having a projector, comprising:
an imaging unit that photographs a subject;
a mirror image converting unit that converts a live view image photographed by the imaging unit into a mirror image;
a projector that projects the mirror image of the live view image in a direction opposite to a photographing direction of the imaging unit;
a control unit that initiates actual photography for recording the subject by the imaging unit when a posture of a main subject satisfies a predetermined condition; and
a pose image superimposing unit that superimpose a pose image on a projected image,
wherein the control unit determines that the predetermined condition is satisfied and performs the actual photography when a superimposition degree of the main subject in the projected image and the pose image is a threshold value or more, and
the control unit extracts an outline shape of the main subject in the projected image, and performs enlargement and reduction of the pose image so that a size of the outline shape is coincident with a size of the pose image,
wherein the imaging unit photographs a stereoscopic image, and
the outline shape is extracted from a subject which is detected using the stereoscopic image and present at the same distance from the imaging apparatus.

2. An imaging apparatus having a projector, comprising:
an imaging unit that photographs a subject;
a mirror image converting unit that converts a live view image photographed by the imaging unit into a mirror image;
a projector that projects the mirror image of the live view image in a direction opposite to a photographing direction of the imaging unit;
a control unit that initiates actual photography for recording the subject by the imaging unit when a posture of a main subject satisfies a predetermined condition; and
a pose image superimposing unit that superimpose a pose image on a projected image,
wherein the control unit determines that the predetermined condition is satisfied and performs the actual photography when a superimposition degree of the main subject in the projected image and the pose image is a threshold value or more, and
the control unit extracts an outline shape of the main subject in the projected image, and performs enlargement and reduction of the pose image so that a size of the outline shape is coincident with a size of the pose image,
wherein the control unit displays information indicating the superimposition degree to be superimposed on the projected image.

3. The imaging apparatus of claim 2, wherein the control unit displays the information indicating the superimposition degree and a value of the threshold value to be superimposed on the projected image.

* * * * *